July 8, 1952 — L. E. NORTON — 2,602,828
RADIO-FREQUENCY POWER MEASURING SYSTEM
Filed April 29, 1947 — 2 SHEETS—SHEET 1
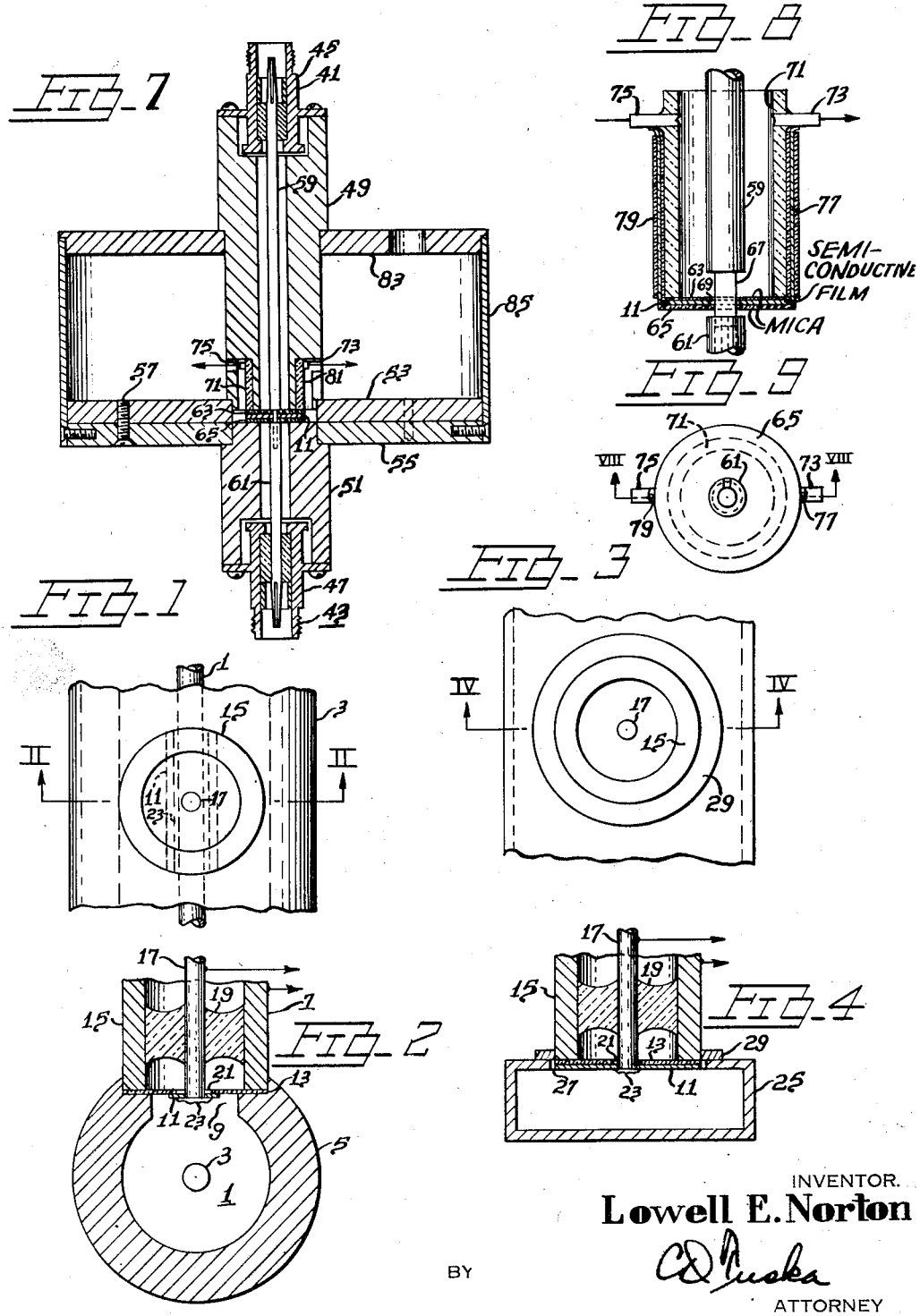
INVENTOR.
Lowell E. Norton
BY
ATTORNEY

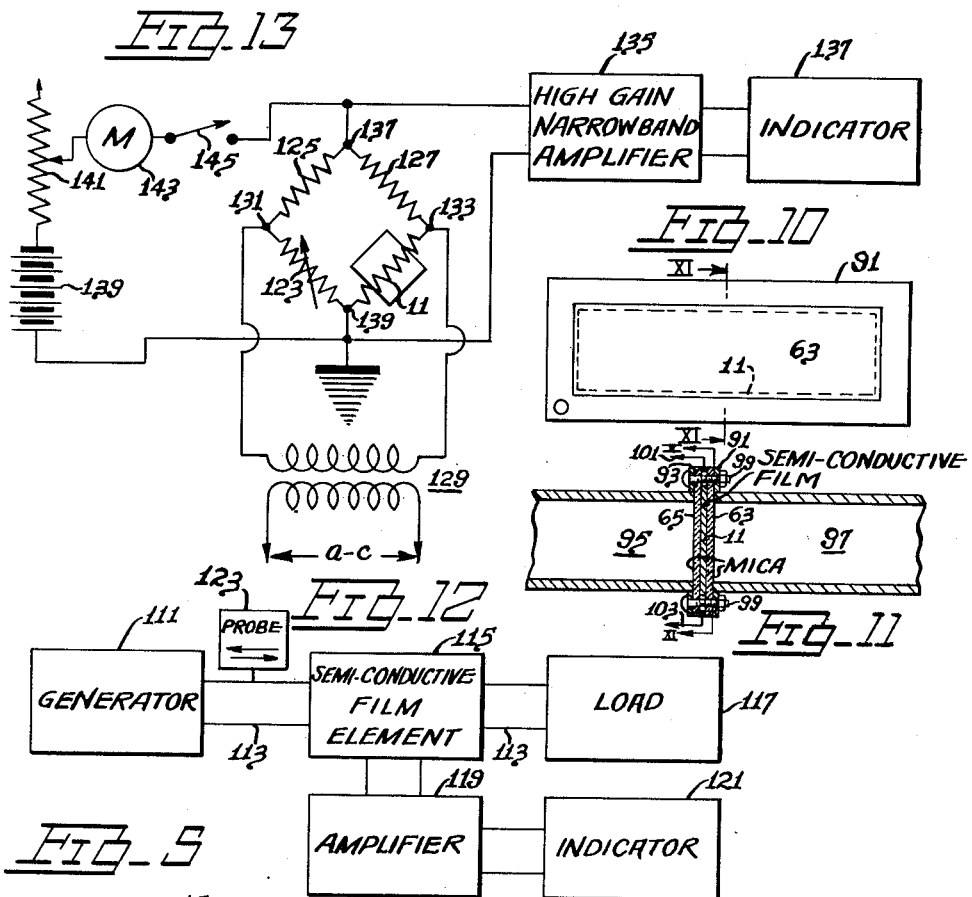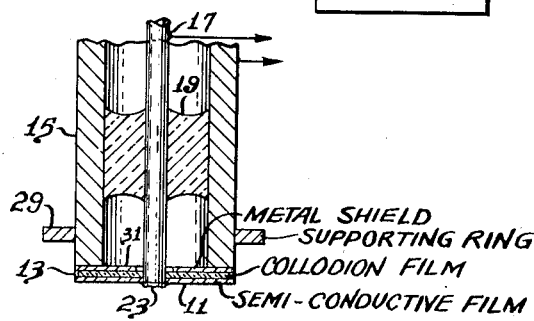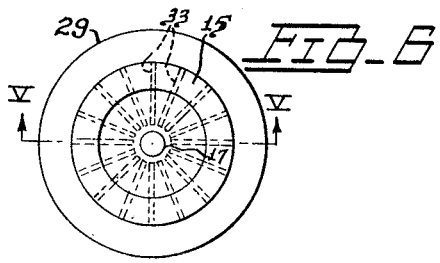

Patented July 8, 1952

2,602,828

UNITED STATES PATENT OFFICE 2,602,828

RADIO-FREQUENCY POWER MEASURING SYSTEM

Lowell E. Norton, Princeton Junction, N. J., assignor to Radio Corporation of America, a corporation of Delaware Application April 29, 1947, Serial No. 744,617

19 Claims. (Cl. 171—95)

This invention relates generally to radio frequency energy measurement systems and more particularly to substantially frequency independent power measurement systems for radio frequency energy transmitted through coaxial or waveguide transmission systems.

Most radio frequency power measurement systems employed heretofore have had the disadvantage that either they were frequency dependent, lacking in sensitivity, or have required a relatively large proportion of the total transmitted power to provide satisfactory power measurements. The instant system is substantially independent of the operating frequency up to values of the order of 10,000 megacycles, and permits measurement of transmitted radio frequency power without disturbing the normal load termination connected to the radio transmission frequency line. Furthermore, objectionable discontinuities are eliminated from the radio frequency transmission line thereby obviating usual difficulties involving wave reflections from the measurement apparatus.

In the power measuring system disclosed hereinafter, the power responsive measuring element comprises a semi-conductive film which is thin with respect to the skin depth of the radio frequency currents in the conductors of the line. The semi-conductive film, of tellurium-zinc or the like, is inserted into the radio frequency transmission system, either in parallel with, or preferably transverse to, the axis of wave propagation therein. Due to its extremely small thickness and volume, the film and its support introduces negligible discontinuity to the transmitted waves, hence producing negligible wave reflections. The device dissipates only a small fraction, for example .5 percent to .05 percent, of the transmitted power. Either the temperature rise or voltage induced in the semi-conductive element due to the power absorbed thereby, or the change in resistance thereof due to the absorbed power, is employed to provide direct indications of the transmitted radio frequency power in the line.

The instant invention may comprise several different forms adapted to the measurement of radio frequency power through either coaxial or waveguide transmission systems. A first embodiment of the invention comprises a semi-conductive film having a thickness not exceeding a few thousand angstrom units, supported by an extremely thin film of collodion or similar material having a low radio frequency loss factor. The collodion film, which is relatively tough and resilient should be as thin as practicable in order to minimize wave discontinuity from the semi-conductive film support. Collodian films as thin as 50 to 100 angstrom units have been employed satisfactorily. In the first embodiment of the invention adapted to wave measurement in a coaxial line transmission system, a small opening is cut into the outer transmission line conductor, and the semi-conductive film supported by the collodion film is suspended within the opening and supported in position at the end of a cylindrical tube which is sealed into the opening. A center conductor, supported in the cylindrical tube by an annular insulator, is connected to the center of the semi-conductive film, the resulting coaxial conductors connected to the semi-conductive film comprise a second coaxial or indicator transmission line which is connected to the input of the wave measurement indicating apparatus. A variation of said first embodiment of the invention utilizes a conductive disc disposed on the opposite side of the collodion film from the semi-conductive element, the conductive disc being connected to the outer indicator line cylindrical conductor but separated from the inner conductor thereof. Such a conductive disc effectively isolates the semi-conductive film from external fields in the indicator line which might provide spurious wave measurement indications.

A still further modification of said first embodiment of the invention utilizes a shielding disc disposed adjacent to the semi-conductive element on the opposite side therefrom of the supporting collodion film wherein the shielding element comprises a plurality of inwardly radially extending spokes connected to the outer indicator line conductor but separated from the inner conductor thereof. This modification of the invention obviates difficulties which might be encountered at extremely high operating radio frequencies from circulating currents and resonance effects in a solid shielding element.

A second embodiment of the invention adaptable to wave measurements in waveguide transmission systems utilizes a semi-conductive element supported by a collodion or similar film support and occupying a cut-out portion of one of the walls of the waveguide transmission system. The semi-conductive element is connected as described heretofore, through its associated coaxial indicator line to the indicating apparatus. The solid or radial types of shielding elements may be employed if desired in the same manner as described heretofore with respect to the coaxial line measurement system.

Both of the first two embodiments of the invention provide satisfactory wave measurements sensitivity and introduce negligible wave discontinuities into the transmission line, but due to the fact that they are dependent upon a variable division ratio of circulating currents in the transmission line conductors to currents in the thin film, they are somewhat frequency dependent and a correction factor must be employed if the apparatus is utilized over extremely wide transmission frequency ranges.

A preferred embodiment of the invention, adaptable to either coaxial line or waveguide transmission systems, utilizes a semi-conductive film supported between extremely thin mica sheets and disposed transversely of the axis of wave propagation in the transmission system. Due to the extremely small axial dimensions of the supporting and energy absorbing elements disposed transversely of the transmission line, wave discontinuities may be substantially disregarded and thus wave reflections are not objectionable. Since the system employing a transverse energy absorbing element is not dependent upon a division of circulating currents in the transmission line conductors and in the thin film, the energy response is substantialy independent of the operating frequency up to frequencies at least as high as 10,000 megacycles. The low frequency limit is determined only by the capabilities of the radio frequency energy transmission system and by the fact that the semi-conductive film is of necessity capacitively coupled to the conductors of the transmission line. In the latter embodiment of the invention, connections are made to opposite sides of the semi-conductive film for connection to the indicating apparatus.

It should be understood that the shape of the semi-conductive film and its supporting elements in each of the embodiments of the invention disclosed herein may be varied as desired to suit the individual transmission line conformation and transmission characteristics. Furthermore, the thickness of the semi-conductive film and its supporting collodion or mica elements are determined by the maximum frequency for which power measurements are to be made and by the maximum permissible thermal mass to provide the desired short thermal time constant.

Among the objects of the invention are to provide an improved method of and means for measuring radio frequency energy in a wave transmission system. Another object is to provide an improved method of and means for providing radio frequency power measurements which are substantialy independent of the operating frequency. A further object is to provide an improved method of and means for measuring radio frequency power in a radio frequency transmission system with minimum wave discontinuity and wave reflections due to the measurement apparatus. An additional object is to provide an improved wide frequency band radio frequency power measurement system of high sensitivity and power efficiency. A still further object of the invention is to provide an improved wide band radio frequency power measurement system which introduces negligible wave reflections and absorbs an extremely small portion of the transmitted energy from the transmission line, wherein the measurement apparatus has an extremely short thermal time constant and is capable of power measurements over a wide power range. A still further object of the invention is to provide an improved wide frequency band radio frequency power measurement system operable with either coaxial line or waveguide transmission systems. Another object of the invention is to provide an improved wide frequency band radio frequency power measurement system utilizing a wave sensitive element comprising a film of semi-conductive material such as tellurium-zinc alloy which is thin with respect to the skin depth of radio frequency currents at the operating frequencies.

The invention will be described in greater detail by reference to the accompanying drawings of which Figure 1 is a top plan view of a first embodiment of the invention adapted to the measurement of radio frequency power in a coaxial transmission line system; Figure 2 is a cross-sectional elevational view taken along the section line II—II of Fig. 1; Figure 3 is a top plan view of another embodiment of the invention adapted to the measurement of radio frequency power in a waveguide transmission system; Figure 4 is a cross-sectional view, taken along the section line IV—IV of Fig. 3; Figure 5 is a cross-sectional elevational view, taken along the section line V—V of Fig. 6, of a portion of the devices shown in Fig. 2 or 4 and including a metal shield and supporting ring for the wave detecting element; Figure 6 is a bottom view of a modification of the device shown in Fig. 5 employing radial shielding elements within the indicator transmission line; Figure 7 is a cross-sectional view of a preferred embodiment of the invention adapted to radio frequency power measurements in a coaxial line transmission system; Figure 8 is an enlarged, exploded fragmentary view of a portion of the device shown in Fig. 7; Figure 9 is a bottom view of the device shown in Fig. 8, Figure 8 being a cross-sectional view taken along the section line VIII—VIII of Fig. 9; Figure 10 is a cross-sectional view of still another preferred embodiment of the invention employing a transverse measurement element in a waveguide transmission system; Figure 11 is a cross-sectional elevational view taken along the section line XI—XI of the device of Fig. 10, Figure 10 being a cross-sectional view taken along the section line X—X of Fig. 11; Figure 12 is a block circuit diagram of a measurement system employing the system, and Figure 13 is a schematic circuit diagram of a bridge measurement indicating system employing the invention. Similar reference characters are applied to similar elements throughout the drawings.

Referring to Figures 1 and 2 of the drawings, a first embodiment of the invention adapted to measurements of radio frequency power in a coaxial trasmission line 1 having inner and outer conductors 3, 5 respectively, comprises a semi-conductive film device 7 opening into an aperture 9 in the outer conductor 5 of the transmission line. A semi-conductive film 11 comprising, for example, a deposit of tellurium-zinc, having a thickness less than the skin depth of the radio frequency currents at the operating frequencies, is supported by a similarly thin film 13 of collodion which in turn is supported at the end of a cylindrical conductive element 15. A center conductor 17 is supported on the axis of the cylindrical conductor 15 by an insulating spacer 19 to form an indicator circuit coaxial line. The center conductor 17 of the indicator coaxial line 7 passes through an aperture 21 at the center of the collodion film 13, and is connected to the semi-conductive film 11 by a drop of "Aquadag" or other soluble conductive material.

It should be understood that the semi-con ductive film 13 may be formed as an annular ring or as a longitudinal strip as indicated in Figure 1, or that other cross-sectional shapes may be employed. The combined thickness of the semi-conductive film 11 and collodion supporting film 13 should not exceed a few thousand angstrom units in order that the element may have small thermal mass and short thermal time constant. The collodion film 13 should be as non-dissipative as possible at the maximum microwave frequency employed. Such thin collodion films may be secured by dropping extremely dilute collodion on a water surface, and lifting the film from the water surface by contact with the end of the cylindrical indicator line conductor 15. The semi-conductive film 11 of tellurium-zinc or the like then may be evaporated to the desired thickness and density directly upon the collodion film. By control of the conductivity and thickness of the semi-conductive film, it is possible to choose the fraction of the total transmitted power in the transmission system which will be dissipated in the film.

The two connections to the film, the inner and outer coaxial conductors 17, 15 respectively of the indicator line 7 thence may be connected to the measurement apparatus for observing the resistance change or the absorbed microwave power in response to microwave energy transmitted through the coaxial transmission line 1.

The semi-conductive film may be connected as an arm of a four element A.-C. bridge whereby its variation in resistance in response to temperature changes due to absorbed microwave energy may be readily determined, and the transmitted microwave power calculated therefrom. Alternatively the semi-conductive film 11 may be coupled through the indicator transmission line 15, 17 to a wave detector and a voltage determining circuit which measures the microwave voltage induced between the terminals of the film in response to absorbed microwave energy. Since the resistance of the tellurium-zinc alloy film is quite non-linear with applied potential, it is desirable to connect it to a narrow band, high gain amplifier in order to avoid spurious indications due to higher order harmonics which would disturb the linearity of the indicating system.

Figures 3 and 4 indicate a typical method of utilizing the semi-conductive film device of Figs. 1 and 2 for measurement of transmitted energy through a waveguide 25. A circular opening 27 is cut into the upper wide face of the waveguide 25, and the indicator coaxial line 15, 17 supporting the semi-conductive film 11 is secured to the upper waveguide face by means of a circular flange 29. The semi-conductive film 11 may be circular in shape or, if desired, may be any other desired shape to minimize undesired local resonance effects.

Figures 5 and 6 show modifications of the indicator coaxial line and semi-conductive film structure wherein the collodion film 13 is backed by a metal shield 31 in contact with the outer cylindrical conductor 15 of the indicator line but having an aperture at its center spacing it from the center indicator conductor 17. Figure 6 illustrates a modification of the metal shield 31 comprising a plurality of inwardly radially extending metallic arms 33 connected to the outer indicator line conductor 15 but separated from the central indicator line conductor 17. The shielding effect of the radial arms 33 is quite satisfactory for all practicable operating frequencies of the transmission line and may be utilized to eliminate undesired local resonance effects in the metal shield.

To determine the fraction of the total transmitted power which is dissipated in the semi-conductive film, the normal termination of the coaxial transmission line 1 is replaced by a power measuring device of any type known in the art which absorbs all of the transmitted power applied thereto. The indications provided by the semi-conductive film thus may be readily calibrated. Another method of determining the fraction of power absorbed by the semi-conductive film is by substituting known resistances in the measurement bridge to provide balance thereof for different incremental values of the semi-conductive film resistance for known values of power supplied to the transmission line termination. From the known temperature-resistance coefficient of the semi-conductive film material, the corresponding temperature rise therein may be computed. From the dimensions and geometry of the semi-conductive film element, the power necessary to produce such temperature variations may be calculated.

This calculation, or measurement, of the fraction of the total power in the system which is dissipated in the film need only be made during initial adjustment and calibration of the system.

For a termination which provides unity standing-wave-ratio in the transmission system the device then provides an output voltage which is proportional to the square of the magnetic field density at the film, or proportional to the power in the system if the indicator system is linear.

For any other termination giving any other standing wave ratio it is necessary to measure with a wave probe the standing wave ratio and the relative field value at the film as measured with the probe $n\lambda/2$ from the film. With this information it is possible to calculate the power from the indicated reading.

Since, as is well known, the fields in a waveguide system have a frequency dependence it is advantageous to substitute the coaxial transmission system, which is made to propagate only the principal mode. The dissipative film is mounted on a cylindrical unit but it is convenient to make the film in strip or ribbon form instead of circular cross-section.

The systems of Figures 1 to 6 provide power measurements which have a frequency dependence which exists for the following reason:

The material of conductivity $\sigma_1$ and thickness $d$ is embedded in the outer wall of a coaxial line of higher conductivity $\sigma_2$ and a thickness greater than skin depth.

The thin film is purposely made of poorly conducting material. For a semi-conductor in which $\sigma_1$ is still large enough so that $$\frac{\sigma_1}{\omega} > \epsilon_1$$

the propagation constant is $$\delta = (1+i)\sqrt{\pi\mu_1 f \sigma_1}$$

and the depth of penetration of the field is $$a = \frac{1}{\sqrt{\pi\mu_1 f \sigma_1}}$$

where $f$ is the frequency and $\mu_1$ the permeability. If the current density at the surface (at $x=0$) is $i_0$, then $$i_x = i_0 e^{-\gamma x} = i_0 e^{-(1+i)x/a} \tag{1}$$

The total current in the semi-conductor is $$I_1 = \int_0^d i_0 e^{-(1+i)x/a} dx \qquad (2)$$

$$I_1 = \int_0^d i_0 e^{-(1+i)x/a} dx = i_0 \left| \frac{-a e^{-(1+i)x/a}}{1+i} \right|_0^d$$

$$= \frac{i_0 a}{1+i}[1 - e^{-(1+i)d/a}] \qquad (3)$$

Expanding $e^{-(1+i)d/a}$ $$e^{-(1+i)d/a} = 1 - (1+i)d/a + (1+i)^2(d/a)^2 + \ldots \qquad (4)$$

From (3) and (4)

$$I_1 = \frac{a i_0}{1+i}\{1 - [1 - (1+i)d/a + (1+i)^2(d/a)^2 + \ldots]\}$$

or $$I_1 = i_0 d[1 - (1+i)d\sqrt{\pi f \mu_1 \sigma_1} + \ldots] \qquad (5)$$

The electric intensity at the surface is $$E = \frac{i_0}{\sigma_1} \qquad (6)$$

and the impedance of the semi-conductor is $$Z_1 = \frac{\frac{i_0}{\sigma_1}}{i_0 d[1 - (1+i)d\sqrt{\pi f \mu_1 \sigma_1} + \ldots]}$$

or $$Z_1 = \frac{1}{\sigma_1 d[1 - (1+i)d\sqrt{\pi f \mu_1 \sigma_1} + \ldots]} \qquad (7)$$

so that for $d/a \ll 1$ $$Z_1 \cong \frac{1}{\sigma_1 d} \qquad (8)$$

The power dissipated in the film is $$P_1 \cong I_1^2 Z_{1\,real} \cong \frac{i_0^2 d^2}{\sigma_1 d} \cong \frac{i_0^2 d}{\sigma_1} \qquad (9)$$

The average power absorbed per unit length of the outer conductor, thick on a skin depth scale, and of inner diameter $b$ is $$P_2 = \int_0^{2\pi} \tfrac{1}{2} Re\, n H_\theta^2 b\, d\theta \qquad (10)$$

where $$n = \frac{E_\theta}{H_\theta}$$

$$P_2 = \tfrac{1}{2}\sqrt{\frac{\pi f \mu_2}{\sigma_2}} \int_0^{2\pi} \frac{I_2^2 b\, d\theta}{4\pi^2 b^2} = \sqrt{\frac{\pi f \mu_2}{\sigma_2}} \frac{I_2^2}{4\pi b} \qquad (11)$$

But $P_2$ is also $$P_2 = \tfrac{1}{2} I_2^2 r_2$$

where $r_2$ is the resistance per unit length of outer conductor, so that $$r_2 = \frac{1}{2\pi b}\sqrt{\frac{\pi f \mu_2}{2}} \qquad (12)$$

The total longitudinal current $I^t$ is assumed to be the same with or without the thin strip since to a first approximation $E_r$ and $H_\theta$ remain unchanged.

The current density in the thin strip is uniform and is $I_1$. The power dissipated in the thin film is $P_1$ and depends on the current division ratio $I_1/I_2$. Also $I_t = I_1 + I_2$.

Since the two conductors are approximately in parallel for longitudinal current flow $$I_1 = \frac{r_2}{r_1 + r_2} I_t \qquad (13)$$

$$P_1 = \left(1_t \frac{r_2}{r_1 + r_2}\right)^2 r_1 = \frac{I_t^2}{\left(1 + \frac{r_1}{r_2}\right)^2} r_1$$

If as is always the case, $r_1/r_2 \gg 1$ $$P_1 \cong I_t^2 \left(\frac{r_2}{r_1}\right)^2$$

and from (8)

$$P_1 = I_t^2 r_2^2 \sigma_1 d \qquad (14)$$

From (12)

$$r_2 = \frac{1}{2\pi b}\sqrt{\frac{\pi f \mu_2}{2}}$$

so that $$P_1 = I_t^2 \frac{\pi f \mu_2}{4\pi^2 b^2 \sigma_2} \sigma_1 d = \frac{I_t^2 f \mu_2 \sigma_1 d}{4\pi b^2 \sigma_2} \qquad (15)$$

which indicates that the power dissipated in the thin film of conductivity $\sigma_1$ is proportional to the frequency, $f$. This conclusion is based upon the assumption that a thin semi-conductive film has only the properties of a scaled down thin section of conductor. There is some evidence, although rather incomplete, that evaporated thin films of certain metals exhibit either an equivalent series inductance or shunt capacitance effect which, over a predetermined frequency range substantially eliminates the power-frequency dependence. However, in general the foregoing conclusions regarding frequency dependence tend to limit the useful frequency response of the system.

For this reason, the broadband operation the embodiments of the invention shown in Figures 7 to 11 are preferred. The thin semi-conductive film in the form of a circular disc is placed normal to the axes of the conductors of the coaxial line or to the direction of wave propagation of a waveguide transmission system. In the coaxial line preferred embodiment of the invention, the disc is mounted on a thin supporting membrane (mica is satisfactory if thin) supported on the end of a glass cylinder. This assembly is inserted in a groove in the thick walled outer conductor. The glass is not exposed to the radio frequency fields. Contact leads are brought out on opposite sides of a diameter by platinum and silver surfaces painted and baked on the sides of the glass and then to metal terminals sealed in the glass.

A preferred embodiment of the invention which is substantially independent of operating frequency and which is adapted for measurement of transmitted power in a coaxial transmission line, utilizes a semi-conductive film supported between extremely thin mica wafers and disposed transversely of the axis of wave propagation in the coaxial transmission line. Referring to Figures 7, 8 and 9, the measurement apparatus includes a pair of input and output coaxial line connectors 41, 43 adapted for serial connection in a coaxial power transmission line, not shown. The outer shells 45, 47 respectively of the connectors 41, 43 are connected to cylindrical conductive elements 49, 51 respectively, which are aligned by annular plates 53, 55 secured together by screws 57. The center conductor of the coaxial line in the measurement device includes a pair of telescoped conductive rods 59, 61 which are terminated in the connectors 41, 43, respectively.

The semi-conductive film element 11 is supported between thin parallel disposed mica sheets 63, 65, which are apertured for passage of a reduced diameter portion 67 of the inner coaxial line conductive rod 59. The telescopic portions 59, 61 of the inner coaxial line conductor thus may be telescoped to contact the respective mica sheets 63, 65. The semi-conductive film 11 includes a central aperture 69 sufficiently large to provide clearance for the reduced diameter portion 67 of the center conductor of the coaxial line. The mica sheets 63, 65 enclosing the semi-conductive film 11 are cemented to one end of a cylindrical insulating member 71 having metallic contacts 73, 75 molded therein and connected through insulated conductors 77, 79 to opposite sides of the semi-conductive film. The connections to the film may be made by silver solder and silver plating to the edges of the film.

The insulated supporting structure 71 carrying the semi-conductive film is inserted into a keyhole slot 81 milled into the outer coaxial conductor 49 coaxially with the aperture therethrough. Connection leads from the terminals 73, 75 are brought out through apertures adjacent thereto in the outer conductor 49 of the coaxial line device. An additional enclosure comprising an angular member 83 and coaxial shell 85 may be utilized if desired.

Great care must be exercised in the assembly of the device, since the semi-conductive film 11 supported between the mica sheets 63, 65 must not be objectionably distorted in assembly to the insulating support 71 or in inserting said support in the slot provided therefor in the outer conductor 49. Furthermore, great care must be exercised in telescoping the two portions 59, 61 of the inner coaxial line conductor through the central aperture 69 of the semi-conductive film assembly.

Figures 10 and 11 illustrate the application of said perferred embodiment of the invention to the measurement of the transmission of microwave power in a waveguide transmission system. The semi-conductive film 11 enclosed between extremely thin mica sheets 63, 65 is clamped between flanges 91, 93 on the abutting ends of two sections 95, 97 of a waveguide transmission system. The flanges are secured together by screws 99. Connections 101, 103 are provided to opposite sides of the semi-conductive film 11. Such connections may be provided by platinum of silver surfaces pointed on the edges of the semi-conductive film and silver soldered to suitable conductors. The clamping screws 99 should be insulated from the semi-conductive film by clearance apertures therein.

Figure 12 indicates schematically a typical circuit for employing the semi-conductive film element in a microwave transmission system. A microwave generator 111 connected through a waveguide or coaxial transmission line 113 and the semi-conductive film element 115 supplies radio frequency energy to a load device 117. The connections from the semi-conductive film element 115 are connected to a high gain, narrow band amplifier 119, the output of which is connected to an indicator 121 which may be calibrated in terms of the energy applied to the load 117. Such a system depends upon the energy induced in the semi-conductive film element in response to energy transmitted through the load line 113. If the load element 117 is not properly matched to the transmission line 113, stand- ing waves will result thereon and it is essential that the standing wave ratio be known in order that the load power may be computed. The standing wave ratio may be determined by a longitudinally movable wave probe 123, of any known type, the position of which may be adjusted to provide wave magnitude indications at a point $n\lambda/2$ removed from the semi-conductive film. With this information it is possible to calculate the transmitted power from the indicated reading if the device has been calibrated as described heretofore. For a load termination which provides unity standing wave ratio in the transmission system, the movable probe 123 may be omitted and the indicator may be calibrated to provide an output which is proportional to the square of the magnetic field density at the film or proportional to the power in the system if the amplifier and indicator devices provide linear response.

Figure 13 shows an alternating current bridge circuit for measuring the variation in resistance of the semi-conductive film element in response to radio frequency energy dissipated therein. The calibration of such a system has been described heretofore. Once the system has been calibrated, a D.-C. calibration system may be utilized to avoid errors due to variations in overall gain and to avoid errors due to drift. A bridge network comprising a variable resistor 123 and two fixed resistors 125 and 127 includes the semi-conductive film element 11 as its fourth arm. A source of alternating potential connected through a transformer 129 is coupled to opposite points 131, 133 of the bridge. A high gain, narrow band amplifier 135 is connected to the other remaining balanced points 137, 139 of the bridge. The output of the high gain narrow band amplifier 135 is connected to an indicator 137 which indicates bridge balance.

The D.-C. calibration circuit may include a battery 139 connected through a variable resistance 141, a meter 143 and a switch 145 to apply a predetermined D.-C. voltage to the points 137, 139 of the bridge. As explained heretofore, when a bridge balance has been obtained by adjustment of the bridge variable resistor 123, the value of the resistance of the semi-conductive element may be determined by substituting a known resistor in its place in the bridge network which will maintain the bridge in a balanced condition. Another method which will provide satisfactory indications of transmitted power is to calibrate the variable bridge resistor 123 in terms of transmitted microwave power.

For the case of the thin absorbing film placed in a plane normal to the diretion of propagation the following situation exists. Using ordinary transmission line terminology, the input impedance at the left hand face of the thin film is $$Z_t = Z_0 \frac{Z_0 \sinh \gamma l + Z_R \cosh \gamma l}{Z_0 \cosh \gamma l + Z_R \sinh \gamma l} \quad (16)$$

Assuming the line to be matched, $Z_R$ is real and is merely the characteristic impedance of the line on the load side of the film, $Z_0$ is the complex characteristic impedance of the short thin film, and $Z_t$ for matched conditions is only the characteristic impedance of the line on the generator side of the thin film. $Z_t$ can be made equal to $Z_R$, so that $$Z_R = Z_0 \frac{Z_0 \sinh \gamma l + Z_R \cosh \gamma l}{Z_0 \cosh \gamma l + Z_R \sinh \gamma l} \quad (17)$$

For the case where the line is matched, $Z_R$ is of the form $$Z_0 = Z_R = \frac{\left(\frac{\mu_0}{\epsilon_0}\right)^{1/2}}{2\pi} \log b/a$$

or, more simply $$Z_0 = m\left(\frac{\mu_0}{\epsilon_0}\right)^{1/2} \quad (18)$$

where $\mu_0$ and $\epsilon_0$ have the dimensions of permeability and dielectric constant, respectively, and $m$ is a numerical constant depending on the transmission line geometry. For the case where the thin film has the same inner and outer diameter ratio as the line, and is in effect an extension of the line but with different values of $\mu$ and $\epsilon$, the numerical constant $m$ appears as a common coefficient for all terms, and divides out. Whereas the system was first considered on a "characteristic impedance, $Z_0$" basis, the system then is considered on an "intrinsic impedance, $\left(\frac{\mu}{\epsilon}\right)^{1/2}$" basis As is well known, the dielectric properties of the conducting film may be represented by the complex expression $$\epsilon_1 - \frac{i\sigma_1}{\omega}$$

so that the intrinsic impedance is $$n_1 = \left(\frac{\mu_1}{\epsilon_1 - \frac{i\sigma_1}{\omega}}\right)^{1/2} \quad (19)$$

where $\sigma_1$ is the conductivity. Also $\gamma_1$ the propagation constant, is $$\gamma_1 = i\omega\left[\mu_1\left(\epsilon_1 - \frac{i\sigma_1}{\omega}\right)\right]^{1/2} \quad (20)$$

For the film material most frequently used, a tellurium-zinc alloy, with a conductivity only about $0.86 \times 10^{-5}$ that of copper and operating at frequencies as high as $10^{10}$ cycles/sec.

$$\frac{\sigma_1}{\omega} \gg \epsilon_1$$

$$\gamma_1 = T\underline{/45°} \quad (21)$$

and $$n_1 = U\underline{/45°} \quad (22)$$

Using these values in (17)

$$n = U\underline{/45°} \frac{U\underline{/45°} \sinh(Tl\underline{/45°}) + n \cosh(Tl\underline{/45°})}{U\underline{/45°} \cosh(Tl\underline{/45°}) + n \sinh(Tl\underline{/45°})} \quad (23)$$

Since $n$ is real and positive it is obvious that (23) can be true, exactly, if $$Tl\underline{/45°} \text{ is zero}$$

For $|TL| = 0$, (23) reduces to $$n = n \quad (24)$$

Since $T$ can never be zero, $Tl$ can be zero only for the trivial case $l = 0$ which is the case of zero film thickness.

However, a reasonable approximation of either (17) or (23) may be produced. For $Tl \to 0$ $$\sinh|Tl| = |Tl| \quad (25)$$

$Tl$ is chosen so that $$n = 50 n_1 \gamma_1 l \quad (26)$$

and $$n_1 = 50 n \gamma_1 l \quad (27)$$

or $$\gamma_1 l = 2 \times 10^{-2} \quad (28)$$

The maximum film thickness, $l$, for this approximation follows by use of (28) in (20).

$$l = \frac{2 \times 10^{-2}}{\omega\left[\mu_1\left(\epsilon_1 - \frac{i\sigma_1}{\omega}\right)\right]^{1/2}} \quad (29)$$

The conductivity, $\sigma_1$, of the tellurium-zinc alloy is 500 mho/m. For a maximum frequency of $f = 10^{10}$ cycles/sec. and assuming that $\mu_1$ and $\epsilon_1$ are not greatly different from $\mu_0$ and $\epsilon_0$ in free space $$l = \left|\frac{2 \times 10^{-2}}{2\pi 10^{10}\left[4\pi \times 10^{-7}\left(\frac{10^{-9}}{36\pi} - i\frac{500}{2\pi 10^{10}}\right)\right]^{1/2}}\right|$$
$$= 3.18 \times 10^{-6} \text{ meters} \quad (30)$$

Expressed in angstrom units $$l = 3.18 \times 10^4 \text{ Å}.$$

which is the maximum thickness of the tellurium-zinc film to fulfill the approximation of (26) and (27).

For the film equal to or less than about $l = 3.2 \times 10^4$ Å. the discontinuity and resulting reflection at the film is slight, and from continuity the longitudinal current must equal the longitudinal current in the line.

Thus the invention disclosed and claimed herein comprises an improved wide frequency band power measuring system for radio frequency signals in a coaxial or waveguide transmission system wherein the wave sensitive element comprises an extremely thin film of semi-conductive material providing negligible wave discontinuities in the transmission system and having sufficient sensitivity to provide power indications with negligible power dissipation. The system disclosed provides accurate power indications for all frequencies from the lowest value which may be transmitted through the transmission system to frequencies in excess of 10,000 megacycles.

I claim as my invention:

1. A wide frequency band device for measuring radio frequency energy comprising a radio frequency transmission line coupling a source to a load, a semi-conductive sheet element having a thickness less than the radio frequency current skin depth in said element at the highest operating frequency of said energy, and means for coupling said element into said line for subjecting said element to said energy to vary the impedance of said element, whereby the impedance of said element varies as a function of the energy absorbed thereby.

2. A device according to claim 1 wherein said element comprises a substantially microwave transparent support having a semi-conductive coating on one side thereof.

3. A device according to claim 2 including means for shielding said element from external fields other than said radio frequency energy to be measured.

4. A device according to claim 2 wherein the thickness of said support is less than 500 Å. and the thickness of said coating is less than 2000 Å.

5. A device according to claim 2 wherein said coating comprises tellurium-zinc.

6. A wide frequency band device for measuring radio frequency energy in a transmission line comprising a semi-conductive sheet element having a thickness less than the radio frequency current skin depth in said element at the highest operating frequency of said energy, means for coupling said element into said line for subjecting said element to said energy, and connection means for an indicator for indicating the energy absorbed by said element.

7. A wide frequency band device for measuring radio frequency energy transmitted through a wave transmission line from a source to a load comprising a semi-conductive film element, thin with respect to the radio frequency current skin depth in said element at the highest operating frequency of said energy, means for coupling said element into said line for subjecting said element to a portion of said transmitted energy to vary the impedance of said element, and connection means for an indicator for indicating said energy in response to said impedance variation of said element.

8. A wide frequency band device for measuring radio frequency energy transmitted through a waveguide from a source to a load comprising a semi-conductive sheet element having a thickness less than the radio frequency current skin depth in said element at the highest operating frequency of said energy, means for subjecting said element to said energy in said waveguide to vary the impedance of said element, and connection means for coupling to an indicator for indicating said energy in response to said impedance variation.

9. A device according to claim 8 wherein said element effectively comprises a portion of the walls of said waveguide.

10. A device according to claim 8 wherein said element is supported within said waveguide transversely to the axis of energy wave propagation therein.

11. A wide frequency band device for measuring radio frequency energy transmitted through a coaxial line from a source to a load comprising a semi-conductive sheet element having a thickness less than the radio frequency current skin depth in said element at the highest operating frequency of said energy, means for subjecting said element to said energy in said coaxial line to vary the impedance of said element, and connection means for coupling to indicaating means for indicating said energy in response to said impedance variation.

12. A device according to claim 11 wherein said element effectively comprises a portion of the wall of the outer conductor of said coaxial line.

13. A device according to claim 12 wherein said element has its longest dimension parallel to the axis of wave energy propagation along said line.

14. A device according to claim 12 wherein said element terminates a second coaxial line coupled to said indicating means 15. A device according to claim 14 including shielding means disposed substantially transversely within said second line adjacent to said element for shielding said element from fields other than said radio frequency energy in said first line.

16. A device according to claim 11 wherein said element is supported within said coaxial line transversely to the axis of wave energy propagation therein.

17. A wide frequency band device for measuring radio frequency energy comprising a substantially energy transparent film support and a semi-conductive film element deposited on said support, the combined thickness of said support and said element being less than the radio frequency current skin depth in said element and support at the highest operating frequency of said energy, means for subjecting said support and element to said energy to vary the electrical characteristics of said element, and connection means for coupling said element for indicating said energy in response to said variation of said characteristics.

18. Apparatus according to claim 17 including an enclosed transmission line coupling a source of said energy to a load, said element being coupled to said energy in said line, an electrical bridge network including said element, amplifying means connected between said bridge network and said indicating means, and means for calibrating said indicating means to provide indications of the energy coupled to said load.

19. A wide frequency band device for measuring radio frequency energy in a transmission line comprising a support and a semi-conductive sheet element supported by said support interposed in said line and subjected to a portion of said energy, the combined thickness of said support and element being less than the radio frequency current skin depth in said element at the highest operating frequency of said energy, whereby variation of the impedance of said element in response to absorption therein of said energy is indicative of the amount of said energy.

LOWELL E. NORTON.

REFERENCES CITED

The following references are of record in the file of this patent:

UNITED STATES PATENTS

| Number | Name | Date |
|---|---|---|
| 2,106,768 | Southworth | Feb. 1, 1938 |
| 2,151,118 | King et al. | Mar. 21, 1939 |
| 2,197,123 | King | Apr. 16, 1940 |
| 2,366,614 | Hansell | Jan. 2, 1945 |
| 2,399,481 | George | Apr. 30, 1946 |
| 2,429,200 | Bradley et al. | Oct. 21, 1947 |
| 2,432,199 | Kamm | Dec. 9, 1947 |
| 2,441,165 | Ovrebo | May 11, 1948 |
| 2,464,277 | Webber | Mar. 15, 1949 |
| 2,564,706 | Mochel | Aug. 21, 1951 |

OTHER REFERENCES

Article, "Microwave Measurements and Test Equipments," by F. J. Gaffney, published in Proceedings of the I. R. E., vol. 34, no. 10, October 1946. Copy in 178—44—1D.